United States Patent [19]

Throckmorton

[11] 4,168,244

[45] Sep. 18, 1979

[54] CATALYST COMPOSITION CONSISTING ESSENTIALLY OF IRON COMPOUNDS, ORGANOMETALLIC COMPOUNDS AND NITROGEN COMPOUNDS

[75] Inventor: Morford C. Throckmorton, Akron, Ohio

[73] Assignee: The Goodyear Tire & Rubber Company, Akron, Ohio

[21] Appl. No.: 911,854

[22] Filed: Jun. 2, 1978

Related U.S. Application Data

[60] Continuation of Ser. No. 744,013, Nov. 22, 1976, abandoned, which is a division of Ser. No. 526,345, Nov. 22, 1974, Pat. No. 4,048,418.

[51] Int. Cl.$^2$ ............................ C08F 4/04; C08F 4/70
[52] U.S. Cl. .............................. 252/429 B; 252/428; 252/431 C; 252/431 N; 526/140; 526/141

[58] Field of Search ........... 252/429 B, 431 N, 431 C, 252/428

[56] References Cited

U.S. PATENT DOCUMENTS

| | | |
|---|---|---|
| 3,400,113 | 9/1968 | Winter et al. ................. 252/429 B X |
| 3,457,186 | 7/1969 | Marsico ............................. 252/429 B |
| 3,477,999 | 11/1969 | Takeda et al. ............... 252/429 B X |
| 3,669,949 | 6/1972 | Yoo .............................. 252/429 B X |

*Primary Examiner*—Patrick Garvin
*Attorney, Agent, or Firm*—J. Y. Clowney

[57] ABSTRACT

Method of polymerizing conjugated diolefinic monomers containing from 4 to about 12 carbon atoms to high molecular weight polymers by bringing said monomers into contact with a catalyst system consisting of (1) an iron-containing compound, (2) an organometallic reducing agent from Groups I and III of the Periodic Table, and (3) a nitrogen-containing ligand.

3 Claims, No Drawings

CATALYST COMPOSITION CONSISTING ESSENTIALLY OF IRON COMPOUNDS, ORGANOMETALLIC COMPOUNDS AND NITROGEN COMPOUNDS

This is a continuation of application Ser. No. 744,013 filed Nov. 22, 1976, now abandoned which is a division of Ser. No. 526,345, filed Nov. 22, 1974, now U.S. Pat. No. 4,048,418.

This invention is directed to a method of polymerization of conjugated diolefins containing from 4 to about 12 carbon atoms to form homopolymers and copolymers. It is also directed to the catalyst systems used to prepare these polymers. These polymers have utility in tires and other rubber products. Properties of homopolymers range from rubbers to plastics. By random copolymerizing two monomers, it frequently is possible to break up the crystalline (plastic-like) homopolymers and produce copolymers having elastic properties, high tensile strength and improved green strength.

More specifically, this invention is directed to the use of iron containing compounds in conjunction with nitrogen containing ligands as effective catalysts for polymerization of conjugated diolefins to high molecular weight polymers.

A variety of compounds are utilized as catalysts to convert monomeric materials which are capable of being polymerized into high molecular weight polymers. However, the specific types of catalyst components utilized in the instant invention have heretofore not been disclosed.

The catalyst system used in the instant application has several advantages over some of the well-known prior art catalyst systems utilizing other transition metals.

Some catalyst systems utilizing nickel as one of its components can polymerize a monomer such as butadiene but cannot effectively polymerize isoprene or copolymerize isoprene and piperylene. The particular catalyst system of the instant invention has a rather broad general range of uses. It can polymerize and copolymerize a variety of conjugated diolefins and can also polymerize certain isomeric monomer forms that some of the prior art catalyst systems can not successfully polymerize. The advantages of the present catalyst system are that it is a general purpose catalyst system capable of polymerizing a variety of monomers to give polymers with a high degree of stereo regularity, yet able to polymerize to high yields without excessively long polymerization times to give this wide range of polymers with varied physical characteristics. It can also tolerate much higher levels of several frequent impurities that are present in these types of solution polymerization systems, i.e. acetylenes, olefins, cyclopentene and cyclopentadiene.

According to the invention, conjugated diolefinic monomers containing from 4 to about 12 carbon atoms are polymerized to high molecular weight polymers by bringing said monomers into contact with a catalyst system consisting of (1) an iron containing compound, (2) an organometallic reducing agent from Groups I and III of the Periodic Table and (3) a nitrogen containing ligand.

The iron containing compounds of this invention are those which are capable of being reduced. Iron compounds which can be utilized in this invention are salts of carboxylic acids, organic complex compounds of iron, salts of inorganic acids and iron carbonyls. Representative of these iron compounds are ferric oxalate, ferric hexanoate, ferric octanoate, ferric decanoate, ferric stearate, ferric naphthenate, ferrous acetylacetonate, ferric acetylacetonate, ferric-1-ethoxy-1,3-butanedionate, ferrous dimethyl glyoxime, ferric chloride, ferrous chloride, ferric bromide, ferric fluoride, ferric phosphate, ferrous sulfate, iron tetracarbonyl, iron pentacarbonyl and iron nonacarbonyl. Iron compounds which are soluble in hydrocarbons are preferred. The preferred representatives of these iron compounds are iron octanoate, iron decanoate, ferric acetylacetonate and iron naphthenate.

The organometallic compounds useful in this invention are organocompounds of such metals as aluminum, lithium and sodium. By the term "organometallic" is meant alkyl, cycloalkyl, aryl, arylalkyl, alkaryl radicals are attached to the metal to form the organocompound of the particular metal.

Of the organometallic compounds useful in this invention, it is preferred to use organoaluminum compounds.

By the term "organoaluminum compound" is meant a any organoaluminum compound responding to the formula:

in which $R_1$ is selected from the group consisting of alkyl (including cycloalkyl), aryl, alkaryl, arylalkyl, alkoxy, hydrogen, cyano and halogen, $R_2$ and $R_3$ being selected from the group of alkyl (including cycloalkyl), aryl, alkaryl and arylalkyl. Representative of the compounds responding to the formula set forth above are: diethylaluminum fluoride, diethylaluminum chloride, di-n-butylaluminum chloride, diisobutylaluminum chloride, dioctylaluminum chloride, diphenylaluminum chloride, diethylaluminum bromide and diethylaluminum iodide. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl-n-propylaluminum hydride, p-tolyl ethylaluminum hydride, benzyl-n-propylaluminum hydride, and other organoaluminum hydrides. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyl diphenylaluminum, ethyl di-p-tolylaluminum, ethyl dibenzylaluminum, diethyl phenylaluminum, diethyl p-tolylaluminum, diethyl benzylaluminum and other triorganoaluminum compounds. Also included are diethylaluminum cyanide, diethylaluminum ethoxide, diisobutylaluminum ethoxide and dipropylaluminum methoxide. Ethylaluminum dichloride and ethylaluminum sesquichloride also may be used as the organoaluminum compound.

By the term "organolithium compounds" is meant any organolithium compound responding to the formula R—Li where R is an alkyl, alkaryl, arylalkyl or aryl group. Representative among the compounds responding to the formula set forth above are ethyllithium, propyllithium, n-, sec- or t-butyllithium, hexyllithium, styryllithium or phenyllithium. The term "organolithium compounds" also refers to catalysts responding to the formula Li-R-R'-Li such as difunctional lithium catalysts, for example, DiLi-1, DiLi-3 and the like, which are produced by Lithium Corporation of America.

Organosodium compounds include tetraethyl sodium aluminum and diethyl sodium aluminum dihydride.

Also, by the term "organolithium aluminum compounds" is meant any compound responding to the formula $R'R''_3LiAl$ where $R'$ and $R''$ may be hydrogen, alkyl, alkaryl, or arylalkyl groups. $R'$ and $R''$ may or may not be the same. Representative of these compounds are tetraethyl lithium aluminum, n-butyltriisobutyl lithium aluminum, tetrabutyllithium aluminum, tetraisobutyllithium aluminum, butyl triethyl lithium aluminum, styryl tri-normal propyl lithium aluminum, triethyl lithium aluminum hydride and diethyl lithium aluminum dihydride.

The nitrogen containing ligand used in the practice of this invention must contain at least two functional groups or atoms which are capable of coordinating with the iron. One of these functional groups must be a cyano group, that is, —C≡N. The second functional group may be (a) another cyano group, (b) azo (—N=N—), (C) imino

(d) vinylene

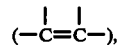

(e) mercapto (—SH), (f) hydroxyl (—OH), (g) thio (—S—) or (h) oxygen atom. There must not be more than two additional carbon atoms separating the cyano and the second functional group. The exact nature or mechanism of the coordination of the nitrogen containing ligands with iron is not known, although it generally is hypothesized that two functional groups coordinate as a bidentate ligand with the iron. According to this hypothesis, and depending on the nature of the nitrogen containing ligand, it may form a four, five, six or seven-membered chelate ring with iron. For example, it probably is possible for malononitrile to form a 6-membered ring with iron as follows:

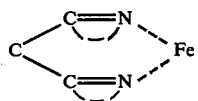

It is pointed out that not all of the nitrogen containing ligands exhibit optimum activity at equivalent mole ratio of ligand to iron. This suggests that all of the ligands probably do not chelate with iron in the same manner. For example, although it is possible to write a ring structure for acrylonitrile chelated with iron, a planar structure involving two moles of acrylonitrile per iron atom also is proposed:

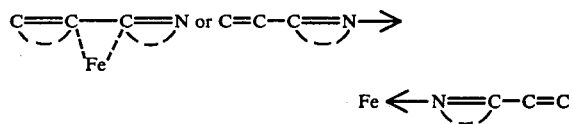

As stated previously, the mechanism is not known, but it is not necessary to know the mechanism in order to understand the present invention. The proposal of a mechanism of chemical reaction is not intended in any way to limit the scope of this invention. It is emphasized that each nitrogen ligand must contain at least one cyano group plus a second functional group; representatives of each of these second functional group classes are as follows:

(a) a second cyano group: cyanogen, malononitrile, succinonitrile, methyl succinonitrile, 1,2-dicyanobenzene, 1,2-dicyanocyclobutane, tetracyanoethane, tetracyanoethylene, hexacyanoisobutylene, 2,5-diamino-3,4-dicyanothiophene, 3,4-dicyanopyrrole, 2,3-dicyano-2-butene, diethylaluminum cyanide and the like;

(b) azo group: azobisisobutyronitrile, 2,2'-azobis-2,4-dimethylvaleronitrile, 2-t-butylazo-2-cyanopropane, 2-t-butylazo-2-cyanobutane, 2-t-butylazo-2-cyano-4-methylpentane, 2-t-butylazo-2-cyano-4-methoxy-4-methylpentane, 1-t-butylazo-1-cyanocyclohexane, ethylene bis(4-t-butylazo-4-cyanovalerate), and 2-(t-butylazo) isobutyronitrile;

(c) imino-dicyandiamide (=cyanoguanidine), iminosuccinonitrile, diiminosuccinonitrile and the like;

(d) vinylene: fumaronitrile, maleonitrile, 1,4-dicyano-2-butene, acrylonitrile, methacrylonitrile, 2-chloroacrylonitrile, diaminomaleonitrile, 1-cyano-1-propene, 1-cyano-1,3-butadiene, 1,2-dicyano-1-butene and the like;

(e) mercapto: 2-mercapto-isobutyronitrile, 2-mercaptopropionitrile;

(f) hydroxyl: acetonecyanohydrin, 2,3-dicyanohydroquinone-1,4, 2-hydroxy-succinonitrile, biacetylcyanohydrin and the like;

(g) thio: butyl thiocyanate, hexyl thiocyanate, benzyl thiocyanate, phenyl thiocyanate, potassium thiocyanate and the like; and (h) oxygen atom: potassium cyanate, 2-cyanoacetamide, 2-cyanoformamide and the like.

The catalyst system of the present invention has polymerization activity over a wide range of catalyst concentrations and catalyst ratios. The catalyst components interreact to form the active catalysts. As a result, the optimum concentration for any one catalyst is very dependent upon the concentrations of each of the other catalyst components. Furthermore, while polymerization will occur over a wide range of concentrations and ratios, polymers having the most desirable properties are obtained over a narrower range.

The molar ratio of the organometallic compound when it is a triorganometallic to the iron compound, Al/Fe, can be varied from about 1/1 to about 400/1; however, a more preferred range of Al/Fe is from about 1/1 to about 4/1. However, when the organometallic compound contains an alkoxy group or halide, then the molar ratio of the organometallic compound to the iron compound, Al/Fe, can be varied from about 6/1 to about 25/1 and a more preferred ratio is about 12/1; and when the organometallic compound is an organolithium compound, then a desirable molar ratio of organometallic compound to the iron compound, Li/Fe, is about 6/1.

The molar ratio of the nitrogen ligand to the iron compound, N/Fe, can be varied depending on which nitrogen compound is utilized; however, a range of about 0.1/1 to about 100/1 can be used, with a more preferred range of N/Fe from about 0.3/1 to about 3/1.

The catalyst components may be charged to the polymerization system as separate catalyst components in either a stepwise or a simultaneous manner, sometimes called "in situ". The components also may be premixed outside the polymerization system and the resulting blend then added to the polymerization system. The catalyst components also may be preformed, that is, premixed in the presence of a small amount of a conjugated diolefin, prior to being charged to the main portion of the solution that is to be polymerized. The amount of conjugated diolefin which may be present during the preforming of the catalyst can range between about 1:1 to about 1000:1 moles per mole of iron compound, and preferably should be between about 4:1 and 50:1 mole ratio; or about 0.1 to 5.0 percent of total amount to be polymerized.

The concentration of the catalyst employed depends on such factors as purity, rate desired, temperature and other factors. Therefore, specific concentrations cannot be set forth except to say that catalytic amounts are used. Polymerizations have been made using molar ratios of monomer to the iron catalyst ranging between 300:1 to 18,000:1, while the preferred molar ratio is generally between about 600:1 and 3700:1. Some specific concentrations and ratios which produce elastomers having desirable properties will be illustrated in the examples given herein to explain the teachings of this invention.

In general, the polymerizations of this invention are carried out in an inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Dichloromethane, tetrachloroethylene, monochlorobenzene and the like also may be used as the solvent. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent in which the polymer formed in insoluble. Since many of the polymers prepared with this novel catalyst system have relatively high molecular weights, an extender oil may be added to the system and the polymerization conducted in its presence, in which case the oil may serve also as a diluent or polymerization solvent. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as $-10°$ C. or below up to high temperatures such as $100°$ C. or higher. However, it is usually more desirable to employ a more convenient temperature between about $20°$ C. and about $90°$ C.

The practice of this invention is further illustrated by reference to the following examples which are intended to be representative rather than restrictive of the scope of this invention. Unless otherwise noted, all parts and percentages are by weight. Dilute solution viscosities (DSV) of the polymers have been determined in toluene at $30°$ C. Glass transition temperatures (Tg) have been determined using a DuPont Model No. 900 Differential Thermal Analyzer (DTA). The melting temperature (Tm) of the polymers generally have been determined with the DuPont No. 900 DTA, but in a few instances a Perkin-Elmer Differential Scanning Calorimeter was used. The number average molecular weight ($M_n$) was determined using a Mecrolab Model No. 501 membrane osmometer.

EXAMPLE I

A purified butadiene (BD) in benzene solution containing 100 grams (gms) of butadiene per liter of solution was charged into a series of 4-ounce bottles. The catalyst components were charged by "in situ" addition in the following order (1) triethylaluminum (TEAL), (2) ferric octanoate (FeOct), and (3) a nitrogen containing ligand, as identified in Table I. The bottles were capped tightly, placed in a water bath maintained at $50°$ C. and then tumbled end over end. The polymerizations were terminated by mixing the polymer cements with one part both of triisopropanolamine and dibutyl-paracresol per hundred parts of monomer. The polymers were dried under vacuum.

Column 1 shows the experiment number, columns 2 through 4 show the amount of catalyst used, column 5 shows the polymerization time, column 6 shows the polymer yield, and columns 7 through 9 show the microstructure makeup of the polymer.

Table 1

| Exp. No. | Millimole/100 g. BD | | | | Time, Hours | Yield, Wt. % | IR analysis, % | | |
|---|---|---|---|---|---|---|---|---|---|
| | TEAL | FeOct | N-Ligand | | | | cis- | trans- | 1,2- |
| 1 | 1 | 0.1 | 0.1 | TCNE[1] | 19 | 77 | | ND[5] | |
| 2 | 12 | 4.0 | 2.0 | TCNE | 1 | 84 | 48 | 18 | 34 |
| 3 | 3 | 1. | 2. | AN[2] | 22 | 63 | 55 | 14 | 32 |
| 4 | 3 | 1 | 1 | ACH[3] | 1 | 100 | | ND | |
| 5 | 3 | 1 | 1 | AIBN[4] | 0.25 | 97 | | ND | |

[1]TCNE = tetracyanoethylene
[2]AN = acrylonitrile
[3]ACH = acetonecyanohydrin
[4]AIBN = azobisisobutyronitrile
[5]ND = not determined.

These polybutadiene polymers were solids which had only limited solubility in benzene. The polymer microstructures were estimated utilizing an infrared film technique. The polymer prepared in Experiment No. 1 had a glass transition temperature, Tg., equal to −32° C.

EXAMPLE II

A premix containing 20 volume percent of isoprene in hexane was prepared and passed down a column of silica gel. A series of four-ounce bottles was charged with 75 ml. of premix and sparged with dry nitrogen. Catalysts were then injected in the amounts indicated in Table 2, the bottles were tumbled end-over-end in a water bath at 50° C. for the indicated times and the contents were tray dried. Polymerization did not occur in Experiments Nos. 1 to 3; the low yields reported in Table 2 were mostly catalyst residues, and a trace of isoprene oligomers. It is necessary to have present each of the three types of catalyst components in order to produce solid polymers.

Table 2

| Exp. No. | Catalyst, mhm[1] | | | Time, Hours | Yield, Wt. % | DSV dl/g. |
|---|---|---|---|---|---|---|
| | TEAL | FeOct | AIBN | | | |
| 1 | 3 | 1 | 0 | 22 | 1 | — |
| 2 | 3 | 0 | 1 | 22 | 2 | — |
| 3 | 0 | 0.5 | 0.5 | 22 | 1 | — |
| 4 | 3 | 0.5 | 0.5 | 4 | 33 | ND |
| 5 | 2 | 1 | 1 | 0.5 | 41 | 12 |
| | | | TCNE | | | |
| 6 | 3 | 1 | 0.5 | 0.5 | 76 | 11 |

[1]mhm = millimoles per hundred parts monomer.

EXAMPLE III

The procedure in this example is similar to Example I except that different iron compounds are utilized in the catalyst compositions:

Table 3

| Exp. No. | Millimole/100 g. BD | | | Time, Hours | Yield Wt. % | IR Analysis, % | | |
|---|---|---|---|---|---|---|---|---|
| | TEAL | Fe | N-Lig. | | | Cis- | trans- | 1,2- |
| 1 | 12 | 4 FeOct[a] | 2 TCNE[e] | 1 | 84 | 48 | 18 | 34 |
| 2 | 6 | 6 FeCl₃[b] | 1 TCNE[f] | 1.7 | 98 | High | Syndio- | 1,2-PBD |
| 3 | 12 | 3 Fe(CO)₅[c] | 3 BuSCN[g] | 17. | 71 | 12 | 2 | 86 |
| 4 | 3 | 1 Fe(Aa)₃[d] | 1 BuSCN[h] | 0.16 | 100 | | ND | |

[a]FeOct = ferric octanoate
[b]FeCl₃ = ferric chloride
[c]Fe(CO)₅ = iron pentacarbonyl
[d]Fe(Aa)₃ = iron acetylacetonate
[e]TCNE = tetracyanoethylene
[f]TCNE = tetracyanoethylene
[g]BuSCN = butyl thiocyanate
[h]BuSCN = butyl thiocyanate An X-ray diffraction pattern of Polymer No. 2 revealed that it had a high degree of crystallinity and that its structure was largely syndiotactic 1,2-polybutadiene. This polymer had a Tg=−21° C. and a Tm. of about 135° C. The polymer prepared with iron pentacarbonyl contained an estimated 86 percent syndiotactic 1,2-polybutadiene based upon a film infrared spectrum.

EXAMPLE IV

This example illustrates the use of various reducing agents with an iron catalyst, using butadiene as the monomer polymerized. The techniques used in this example were similar to those used in Example I.

Table 4

| Exp. No. | Millimole/100 g. BD | | | Time, Min. | Yield, Wt. % | IR Analysis, % | | |
|---|---|---|---|---|---|---|---|---|
| | Reducing Agent | FeAcAc₃ | BuSCN | | | Cis- | Trans- | 1,2- |
| 1 | 0.6[A] | 0.05 | 0.1 | 38 | 59 | | ND | |
| 2 | 1.2[B] | 0.2 | 0.4 | 22 | 91 | | ND | |
| 3 | 3.0[B] | 1.0 | 1.0 | 15 | 100 | 31 | 3 | 66 |
| 4 | 12.0[C] | 2.0 | 2.0 | 18 hr. | 100 | 33 | 6 | 61 |
| 5 | 12.0[D] | 2.0 | 2.0 | 13 min. | 89 | 24 | 8 | 68 |
| 6 | 3.0[E] | 1.0 | 0.5[(a)] | 35 | 96 | | ND | |
| 7 | 2.0[F] | 1.0[(b)] | 0.5[(a)] | 60 | 70 | | ND | |
| 8 | 1.0[G] | 0.5 | 0.5[(c)] | 30 | 100 | | ND | |

[A]TEAL
[B]Et₂AlOEt = diethyl aluminum ethoxide
[C]DEAC = diethyl aluminum chloride
[D]BuLi = butyl lithium
[E]Et₄LiAl = tetraethyl aluminum lithium
[F]NaAlEt₂H₂ = sodium diethyl aluminum hydride
[G]Et₂AlCN = diethyl aluminum cyanide
[(a)]TCNE
[(b)]FeOct
[(c)]AIBN All of the polymers were solids. The soluble portion of Polymer No. 7 had a DSV of 2.4 dl/g, but 78 percent of the polymer was insoluble in toluene. The infrared analyses were estimated on soluble portions of the polymers, using a film technique. Polymer No. 2 had a Tg −27° C.

EXAMPLE V

A C₆-containing hydrocarbon fraction had the following analysis by GLC (gas-liquid chromatography); 72.5 percent 2-methyl-1,3-pentadiene, 11.0 percent 4-methyl-1,3-pentadiene, 9.2 percent 1-methyl cyclopentene, 1.2 percent benzene and 6 percent of other C₆-hydrocarbons which mostly were olefins. Four hundred twenty milliliters (420 ml.) of this hydrocarbon fraction was mixed with 1520 ml. of hexane, and passed down a column containing 300 ml. of silica gel. Then 100 ml. of the solution was charged to each of a series of 4-ounce glass bottles and was sparged with nitrogen. Each bottle contained approximately 12.1 grams of a mixture of 2- and 4-methyl-1,3-pentadienes. Catalysts were injected and polymerizations were conducted at 50° C. with the results as summarized in Table 5.

Table 5

| Exp. | Catalyst, mhm[1] | | | Time, | Yield, | DSV | |
|------|------|------|------|-------|--------|------|-------|
| No. | TIBAL | FeOct | AIBN | Hours | Wt. % | dl/g. | % Gel |
| 1 | 2 | 0.5 | 0.5 | 22 | 33 | 5.60 | 18 |
| 2 | 3 | 1 | 1 | 22 | 55 | 5.57 | 12 |
| 3 | 5 | 2 | 2 | 6 | 68 | 4.68 | 11 |
| 4 | 6 | 4 | 2 | 22 | 68 | 4.03 | 21 |
| 5 | 6 | 3 | 3 | 6 | 77 | 4.01 | 13 |
| 6 | 12 | 6 | 6 | 4 | 92 | 2.86 | 15 |

[1] mhm = millimoles per 100 grams of monomer.

The osmotic Mn (number average molecular weight) of the polymers from Exp. Nos. 1 and 4 were 303,000 and 219,000, respectively. The Tg's of Polymer Nos. 2 and 3 were −22° and −16° C., respectively. NMR analysis of Polymer No. 3 indicated 15 percent 1,2-, 75 percent 1,4- and 10 percent 3,4-structure. An unmasticated gum stock had an ultimate (at break) tensile strength of 200 psi and an ultimate elongation of 1000 percent.

EXAMPLE VI

A preformed catalyst was prepared by injecting into a N₂ flushed and sealed four-ounce bottle, (a) 20 millimoles isoprene in hexane solution, (b) 2 millimoles of 0.25 M TEAL, (c) 1 millimole of 0.25 M FeOct, and (d) 1 millimole of 0.25 M azobisisobutyronitrile (AIBN). The total volume was 29 milliliters.

A purified isoprene (IP) in hexane premix containing 13.3 gms. IP per liter was prepared and 75 ml. was charged to a four-ounce bottle. Then 2.9 ml. of the above preformed catalyst was injected into the premix and the bottle was tumbled end-over-end in a water bath at 50° C. The contents became almost solid after 50 minutes and the polymerization was terminated by adding one phm. of triisopropanolamine and one phm of dibutylparacresol (DBPC).

The yield of dried polymer was 94.5 percent. It had a DSV of 10 dl/g; its gel content was reported to be 13 percent. NMR analysis indicated its microstructure to be about 57 percent 1,4- and 43 percent 3,4-polyisoprene.

EXAMPLE VII

A trans-piperylene premix was prepared by placing enough of a purified piperylene fraction (analysis 95.6 percent trans-piperylene, 3.3 percent cis-piperylene and one percent cyclopentene) in benzene to have 100 grams of piperylene per liter of solution. Seven different alkylaluminum compounds were used and three different iron salts were employed. The catalyst concentration in all instances was $R_1R_2R_3Al:FeX_3:AIBN = 3:1:1$ millimole/100 g. monomer. Polymerization temperature was 50° C. and the time was one hour except for Experiment No. 11 which was 3.5 hours.

Table 6

| | | Yield, Wt. % | | |
| Exp. | | 1.0 Hr. | | Tg, |
| No. | $R_1R_2R_3Al$ | $FeX_3$ = Fe Octoate | DSV | °C. |
|------|------|------|------|------|
| 1 | TEAL[a] | 94 | 4.6 | −1 |
| 2 | TNPAL[b] | 94 | 4.8 | ND |
| 3 | TNHAL[c] | 94 | 4.4 | −12 |
| 4 | TIBAL[d] | 93 | 5.2 | −2 |
| 5 | TIHAL[e] | 91 | 4.7 | −3 |
| 6 | DEA-H[f] | 87 | 4.8 | ND |
| 7 | DIBA-H | 93 | 5.8 | −6 |
| | | $FeX_3$ = Fe (AcAc)₃ | | |
| 8 | TEAL | 95 | 2.3 | −20 |
| 9 | TIBAL | 97 | 3.4 | ND |
| 10 | DIBA-H | 97 | 3.2 | 0 |
| | | $FeX_3$ = Fe stearate | | |
| 11 | TIBAL (in 3½ hours) | 66% | 5.0 | −8 |

[a] triethylaluminum
[b] tri-n-propylaluminum
[c] tri-n-hexylaluminum
[d] triisobutylaluminum
[e] triisohexylaluminum
[f] diethylaluminum hydride

EXAMPLE VIII

A purified premix containing 90 grams per liter of dimethylbutadiene (DMB) in toluene was prepared, and 80 ml. was charged to a series of four-ounce bottles. Catalysts were charged and results obtained as summarized in Table 7. All polymerizations were conducted at 50° C. except Experiment No. 5 which was at 25° C.

Table 7

| Exp. | Catalyst Millimole/100 g. DMB | | | Time, | Yield, | NMR Anal., % | |
| No. | TEAL | FeOct | TCNE | Mins. | Wt. % | 1,4- | 1,2- |
|------|------|-------|------|-------|--------|------|------|
| 1 | 1. | 0.5 | 0.25 | 30 | 58 | | ND |
| 2 | 2. | 1.0 | 0.50 | 30 | 62 | 81 | 19 |
| | | | AIBN | | | | |
| 3 | 2. | 1.0 | 1.0 | 15 | 100 | 83 | 17 |
| 4 | 3. | 2.0 | 1.0 | 15 | 96 | | ND |
| 5 | 3. | 2.0 | 1.0 | 45 | 96 | 78 | 22 |
| | | FeCl₃ | TCNE | | | | |
| 6 | 6. | 6.0 | 1.0 | 15 | 100 | 93 | 7 |

An X-ray diffraction pattern of the polymer produced in Experiment No. 4 showed that it was highly crystalline and its structure was primarily that of cis-1,4-poly(2,3-dimethyl-1,3-butadiene).

EXAMPLE IX

A purified premix containing 10 grams of dimethylbutadiene (DMB) per 100 ml. of solution was prepared by adding 280 ml. of DMB to 1720 ml. of Phillips' ASTM grade normal heptane, passing it down a column of silica gel and finally sparging it with nitrogen. Polymerization temperature = 50° C.

Table 8

| Exp. | Millimole/100 g. DMB | | | Time, | Yield | DSV | % | Tg. |
| No. | TIBAL | FeOct | AIBN | mins. | Wt. % | dl/g. | Insol. | °C. |
|------|-------|-------|------|-------|-------|-------|--------|-----|
| 1 | 3.0 | 1.0 | 6 | 50 | 9.4 | 53 | | −13 |

Table 8-continued

| | | | | | | | | |
|---|---|---|---|---|---|---|---|---|
| 2 | 3.0 TEAL | 0.5 | 0.5 | 3 | 95 | 3.1 | 97 | −33 |
| 3 | 3.0 | 1.0 | 1.0 | 4 | 71 | 6.5 | 70 | −27 |

X-ray diffraction patterns revealed that all three polymers were moderately to highly crystalline, and their crystalline structure was primarily that of cis-1,4-poly(2,3-dimethylbutadiene). The melting temperature, $T_m$, of these polymers was about 149° C.

EXAMPLE X

A premix containing 17.5 volume percent of a distillate fraction which analyzed 86 percent isoprene was prepared in benzene. After drying the premix by passing it down a column of silica gel, and then sparging with dry nitrogen, the resulting premix contained 100 gms. of isoprene per liter of solution. A series of four-ounce bottles containing aliquots of this premix were charged with a variety of catalyst concentrations and ratios and placed in 50° C. bath, and some of the results are summarized in Table 9.

Table 9

| Exp. No. | Catalyst, mhm | | | Time, Hours | Yield, Wt. % | DSV dl/g. | % Gel | Tg. °C. |
|---|---|---|---|---|---|---|---|---|
| | TIBAL | Fe(AcA)₃ | AIBN | | | | | |
| 1 | 3 | 0.1 | 0.1 | 18 | 100 | 19 | 60 | −25 |
| 2 | 3 | 0.1 | 1.0 | 0.8 | 61 | 12 | 13 | −24 |
| 3 | 3 | 0.3 | 0.3 | 1.5 | 76 | 13 | 14 | ND |
| 4 | 3 | 1.0 | 1.0 | 0.25 | 81 | 10 | 11 | −31 |
| 5 | 3 | 0.1 | 10.0 | 18 | 18 | 4.6 | 28 | −34 |
| 6 | 40 | 0.1 | 2.0 | 2 | 34 | 14 | 52 | −24 |

Polymer Nos. 2, 3 and 6 were analyzed by infrared using a solution method. The respective analyses were 40, 38 and 37 percent of 1,4-; 56, 59 and 59 percent of 3,4-; and 3 percent of 1,2-polyisoprene in each polymer.

EXAMPLE XI

A premix solution containing 15 volume percent of isoprene in hexane, or 10 gms. of isoprene per 100 ml. of purified solution, was prepared. A series of four-ounce bottles containing aliquots of this premix were charged with equal amounts of catalyst, namely TEAL: FeOct: AIBN=2:1:1 millimole per 100 gms. of isoprene, and different bottles were polymerized at each of three different temperatures. The results are summarized in Table 10.

Table 10

| Exp. No. | Temp. °C. | Tims, Hours | Yield Wt. % | DSV dl/g. | % Gel | NMR, % | |
|---|---|---|---|---|---|---|---|
| | | | | | | 1,4- | 3,4- |
| 1 | 0 | 22 | 14 | 3.4 | 20 | 53 | 47 |
| 2 | 25 | 1 | 10 | 3.9 | 25 | 51 | 49 |
| 3 | 25 | 7 | 60 | 11.5 | 15 | 53 | 47 |
| 4 | 50 | 1 | 64 | 14.5 | 7 | ND | |
| 5 | 50 | 2 | 93 | ND | | 51 | 49 |

Polymerization occurred much more readily at the higher polymerization temperatures. All polymers were comprised of approximately 50 percent 1,4- and 50 percent 3,4-polyisoprene. The osmotic number average molecular weight, $M_n$, of Polymer No. 4 was 966,000.

EXAMPLE XII

Premix solutions containing 15 volume percent of isoprene (IP) in hexane were prepared and 750 ml. of solution (75 gms. of isoprene) were charged to each of a series of quart bottles. To some of these bottles, a relatively naphthenic type extender oil having a specific gravity of 0.90, and which had been dried over molecular sieves, was added by syringe. Catalysts were injected and then the bottles were placed in a water bath controlled at 50° C. and the isoprene was polymerized while the bottles were rotated end-over-end. Typical conditions and results are presented in Table 11. In Experiments Nos. 2 and 4, 19 and 58 ml. of extender oil were added to the premix prior to addition of the catalysts. Experiments 1 and 3 were conducted without the addition of extender oil. Polymerization proceeded satisfactorily in the presence of the extender oil.

Table 11

| Exp. No. | Catalyst, mhm | | | Time, Hours | Yield, wt % basis IP | Oil phr | ML-4 at 212° F. | DSV dl/g | % Gel |
|---|---|---|---|---|---|---|---|---|---|
| | TEAL | FeOct | Ligand | | | | | | |
| | | | AIBN | | | | | | |
| 1 | 2 | 1 | 1 | 1.0 | 73 | 0 | 44 | 11.1 | 23 |
| 2 | 2 | 1 | 1 | 1.5 | 77 | 30 | 29 | 7.3 | 23 |
| | | | TCNE | | | | | | |
| 3 | 1 | 0.5 | 0.25 | 2 | 84 | 0 | 51 | 19.7 | 18 |
| 4 | 2 | 0.5 | 0.25 | 3 | 100 | 67 | 22 | 5.6 | 10 |

EXAMPLE XIII

A butadiene in benzene premix was prepared by the procedure described in Example I. The relative polymerization activity of a number of dicyano-ligands containing from 1 to 4 carbon atoms attached in a chain between the two cyano groups was compared. The results are summarized in Table 12.

Table 12

| Exp. No. | Millimole/100 g. BD TEAL | Millimole/100 g. BD FeOct | Millimole/100 g. BD Nitrile | Time, Hours | Yield Wt. % | dl/g. | % Gel | IR Analysis, % trans- | IR Analysis, % 1,2- |
|---|---|---|---|---|---|---|---|---|---|
| | | | Malono- | | | | | | |
| 1 | 0.5 | 0.25 | 0.25 | 20 | 65 | 1.09 | 11 | 81 | 18 |
| | | FeDec | Fumaro- | | | | | | |
| 2 | 1.5 | 0.5 | 0.5 | 18 | 86 | 1.37 | 19 | 54 | 38 |
| 3 | 3 | 1.0 | 0.5 | 18 | 93 | 1.22 | 13 | ND | |
| 4 | 3 | 1.0 | 2.0 | 18 | 81 | 1.72 | 30 | 50 | 43 |
| | | FeOct | Succino- | | | | | | |
| 5 | 3 | 1.0 | 1.0 | 19 | 25 | ND | | ND | |
| | | | Glutaro- | | | | | | |
| 6 | 1 | 0.5 | 0.5 | 19 | 4 | (rubbery) | | ND | |
| | | | Adipo- | | | | | | |
| 7 | 1 | 0.5 | 0.5 | 19 | 0.4 | | | | |
| 8 | 1 | 0.5 | 0 | 19 | 1.7 | | | | |

Malononitrile, succinonitrile and fumaronitrile were active ligands; glutaronitrile produced only a four percent yield of polymer, which was solid and rubbery, during 19 hours. Polymerization did not occur in the presence of adiponitrile; the trace of yield reported in Table 12 was oily, possibly an oligomer or thermal dimer, similar to that in the control (Experiment No. 8) run in the absence of any nitrile.

EXAMPLE XIV

A premix was prepared by adding 310 ml. of a cispiperylene fraction, which analyzed 94.6 percent cis- and 5.3 percent trans-1,3-pentadiene to 1690 ml. of hexane. The premix was passed down a column of silica gel, aliquots of 100 ml. were measured into a series of four-ounce bottles and the contents were sparged with nitrogen. Each bottle contained approximately 10 gm. of piperylene. The amount of catalyst charged and the duration of polymerization, at 50° C., are shown in columns 2 through 5 in Table 13.

Table 13

| Exp. No. | Catalyst, mhm[1] TIBAL | Catalyst, mhm[1] FeOct | Catalyst, mhm[1] AIBN | Time, Hours | Yield Wt. % | DSV dl/g | % Gel | Tg °C. |
|---|---|---|---|---|---|---|---|---|
| 1 | 1[2] | 0.3 | 0.3 | 20 | 94 | 10.7 | 10 | ND |
| 2 | 2 | 0.5 | 0.5 | 3 | 74 | 8.0 | 10 | ND |
| 3 | 3 | 1.0 | 1.0 | 1 | 76 | 7.7 | 13 | −55 |
| 4 | 3 | 1.0 | 1.0 | 1.3 | 92 | ND | | ND |
| 5 | 6 | 2.0 | 1.0 | 1 | 68 | 3.9 | 13 | −56 |

[1]Millimole per 100 grams of monomer (piperylene).
[2]TEAL, rather than TIBAL, was charged in Exp. No. 1.

The polymers were readily soluble in aromatic hydrocarbons. Infrared analysis by a solution method of Polymer No. 1 indicated that its microstructure was 93 percent cis-, 4 percent trans- and 3 percent 3,4-polypentadiene. The microstructure of Polymer No. 3 as determined by infrared was 90 percent cis-, 6 percent trans- and 3 percent 3,4-polypentadiene, while by NMR it was 87 percent 1,4-, 7 percent 1,2- and 5 percent 3,4-.

X-ray diffraction patterns of Polymer Nos. 3 and 4 positively identified (identity period=8.1Å) them as crystalline isotactic cis-1,4-polypentadienes. Polymer No. 3 also had a melting temperature, Tm, equal to 50° C.

EXAMPLE XV

A premix was prepared by adding 167 ml. of Phillips' rubber grade butadiene to 1683 ml. of dry benzene, and then adding 150 ml. of isoprene. The premix was passed down a column of silica gel, charged to a series of 4-ounce bottles and sparged with nitrogen. It contained an estimated 5 gm. of butadiene and 5 gm. of isoprene per 100 ml. of solution.

Dialkylaluminum halides were used rather than trialkylaluminums in this series of experiments. All polymerizations were conducted at 50° C. for 17 hours.

Table 14A

| Exp. No. | Millimole/100 g. Monomers DEAB | Millimole/100 g. Monomers FeOct | Millimole/100 g. Monomers TCNE | Yield Wt. % | DSV dl/g. |
|---|---|---|---|---|---|
| 1 | 12 | 1 | 0.5 | 100 | 9.3 |
| | | | AIBN | | |
| 2 | 12 | 1 | 2 | 100 | 4.3 |
| | DEAI[2] | | | | |
| 3 | 12 | 1 | 2 | 100 | 9.6 |

[1]DEAB - diethylaluminum bromide
[2]DEAI - diethylaluminum iodide.

Table 14B

| | Infrared Analysis, % | | | | | |
|---|---|---|---|---|---|---|
| Exp. | Polybutadiene | | | Polyisoprene | | Tg |
| No. | cis-1,4- | trans-1,4- | 1,2- | cis-1,4- | 3,4- | °C. |
| 1 | 4 | 0.4 | 37 | 41 | 18 | −26 |
| 2 | 3 | 0.6 | 38 | 42 | 17 | −27 |
| 3 | 3 | 0.3 | 35 | 41 | 18 | −26 |

EXAMPLE XVI

A premix solution containing approximately 5 gm. of isoprene and 5 gm. of total piperylenes (the piperylene fraction analyzed 88% trans-1,3, 8% cis-1,3-pentadiene, 1,3% isoprene, 1% cyclopentene, 0.2% 1-pentyne and 1.5% unknowns) in 100 ml. in benzene was prepared, purified by passing down a column of silica gel and sparging with nitrogen, and then polymerized in 4-ounce bottles at 50° C. The polymerization conditions and polymer yields are summarized in Table 15A, and the polymer analyses are summarized in Table 15B.

Table 15A

Catalyst Charge,

Table 15A-continued

| Exp. Yield No. | Millimole/100 g monomers | | | Hours | Wt. % |
|---|---|---|---|---|---|
| | TEAL | FeOct | TCNE | | |
| 1 | 2 | 1 | 0.5 | 1.5 | 73 |
| 2 | 3 | 1 | 0.5 AIBN | 17.5 | 99 |
| 3 | 2 | 1 | 1 | 0.5 | 62 |
| 4 | 2 | 1 | 1 | 1.5 | 93 |
| 5 | 3 | 1 | 1 | 0.5 | 76 |
| 6 | 6 | 2 | 2 | 0.5 | 96 |

Table 15B

| Exp. No. | DSV dl/g | % Gel | Tg °C. | Infrared Analysis, % | | | |
|---|---|---|---|---|---|---|---|
| | | | | Polyisoprene | | Polypiperylene | |
| | | | | cis-1,4- | 3,4- | trans- | 3,4- |
| 1 | 4.9 | 19 | −34 | 32 | 32 | 31 | 5 |
| 2 | 2.9 | 17 | ND | | ND | | |
| 3 | 6.8 | 18 | −19 | 29 | 37 | 29 | 5 |
| 4 | 6.6 | 17 | −17 | 27 | 30 | 38 | 5 |
| 5 | ND | ND | ND | | ND | | |
| 6 | 4.3 | 12 | ND | | ND | | |

EXAMPLE XVII

A butadiene (BD) in heptane solution was prepared by the addition of 333 ml. of 1,3-butadiene to 1667 ml. of heptane; and 280 ml. of 2,3-dimethyl-1,3-butadiene (DMB) was added to 1620 ml. of heptane. Each of these solutions were dried by passing down columns of silica gel. Premixes of different compositions were prepared by blending aliquots of these solutions in a series of 4-ounce bottles. The catalyst charge was TIBAL:-FeOct:AIBN=3:1:1 millimole per 100 gm. of monomers. Polymerization temperature was 50° C. The resulting polymers were relatively hard and nonrubbery.

Table 16

| Exp. No. | Monomer Charge, Wt. Ratio | | Time, Mins. | Yield Wt. % | DSV dl/g | % Gel | Tg, °C. |
|---|---|---|---|---|---|---|---|
| | DMB | BD | | | | | |
| 1 | 70 | 30 | 75 | 44 | 7.3 | 52 | −21 |
| 2 | 50 | 50 | 25 | 57 | 5.2 | 82 | −26 |
| 3 | 30 | 70 | 10 | 51 | 2.2 | 93 | ND |

Table 16-continued

| Exp. No. | Monomer Charge, Wt. Ratio | | Time, Mins. | Yield Wt. % | DSV dl/g | % Gel | Tg, °C. |
|---|---|---|---|---|---|---|---|
| | DMB | BD | | | | | |
| 4 | 30 | 70 | 15 | 67 | ND | ND | −43 |

EXAMPLE XVIII

One Hundred and Forty (140) milliliters of 2,3-dimethyl-1,3-butadiene (DMB) were mixed with 860 ml. of Phillips' pure grade n-heptane. A second solution containing 315 ml. of a 95 percent trans- plus 3 percent of cis-1, 3-pentadiene (PD) in 1685 ml. of n-heptane was prepared. Each solution was passed down a separate silica gel column. Blends of these two solutions were prepared by charging separate aliquots to a series of 4-ounce bottles. The solutions were then sparged with nitrogen; the purified premixes were assumed to contain a total of 10 gm. of dimethylbutadiene (DMB) and piperylene (PD) per 4-ounce bottle. The polymerizations were catalyzed by "in situ" addition of 3:1:1 mhm of TIBAL:FeOct:AIBN and polymerizing at 50° C.

Table 17

| Exp. No. | Charge, Wt. % DMB/t-PD | Time, Hours, | Yield Wt. % | DSV dl/g | % Gel | Tg °C. | X-ray; Crystallinity |
|---|---|---|---|---|---|---|---|
| 1 | 100:0 | 0.10 | 50 | 9.4 | 53 | −13 | Yes; cis-1,4-PDMB |
| 2 | 80:20 | 0.75 | 60 | 6.8 | 23 | −13 | Amorphous |
| 3 | 50:50 | 1.50 | 57 | 5.1 | 9 | ND | ND |
| 4 | 50:50 | 4.0 | 91 | 5.2 | 12 | −9 | Amorphous |
| 5 | 20:80 | 2.0 | 70 | 4.7 | 6 | −7 | Slightly; similar to No. 6 |
| 6 | 0:100 | 0.5 | 93 | 4.5 | 27 | −4 | Slightly; syndio-trans-1,2-PPD |

Since the homopolymers are crystalline, the amorphous diffraction patterns indicate the relatively random structure of the copolymers.

EXAMPLE XIX

A series of polymers were prepared in a manner similar to that described in Example XVIII except that only one-half as much catalyst (1.5:0.5:0.5=TIBAL:FeOct:AIBN) was charged to catalyze the copolymers in the present experiment. This series of polymers was analyzed by NMR, but not by X-ray.

Table 18

| Exp. No. | Charge, Wt. % DMB/t-PD | Time, Hours | Yield Wt. % | DSV dl/g | % Gel | Tg, °C. | NMR, % | | |
|---|---|---|---|---|---|---|---|---|---|
| | | | | | | | PPD | PDMB 1/4 | 1,2 |
| 1 | 100:0 | 0.05 | 63 | 8.4 | 52 | −20 | 0 | 72 | 28 |
| 2 | 80:20 | 18. | 85 | 8.0 | 53 | −27 | 19 | 57 | 24 |
| 3 | 20:80 | 18. | 86 | 8.0 | 12 | −13 | 74 | 21 | 5 |

The gum rubber produced in Experiment No. 2 was pressed into ⅛-inch thick dumbbells and had an ultimate elongation=600 percent. Similar properties for Polymer No. 3 were 490 psi and 700 percent.

EXAMPLE XX

A by-product C5-hydrocarbon stream was fractionated. It analyzed by gas-liquid chromatography 53.3% cis-1,3-pentadiene, 8.0% trans-1,3-pentadiene, 34% cyclopentene, 3.1% 2-methyl-2-butene and 0.075% 3-penten-1-yne. A premix containing 10 grams of the pentadienes per 100 ml. was prepared in hexane, passed down a silica gel column, and either 100 or 50 ml. was measured into 4-ounce bottles. To the bottle containing only 50 ml. of premix, 7 cc. of 99 percent 2,3-dimethyl-1,3-butadiene (DMB) from Chemical Samples Company plus 40 cc. of deaerated hexane were injected by syringe, resulting in approximately 5 g. of piperylenes plus 5 g. of DMB in the final premix. The DMB had not been freshly dried and extra TIBAL was added to initiate polymerization. Catalyst added to Experiment No. 1 was TIBAL:FeOct:AIBN=4:2:2 millimoles per 100 g. of monomer while in Experiment No. 2 it was 10:1:1 mhm. Two results are summarized in Table 19.

Table 19

| Exp. No. | Charge, Wt. % DMB:PD | Time Hours | Yield Wt. % | DSV dl/g. | % Gel | Tg. °C. |
|---|---|---|---|---|---|---|
| 1 | 0:100 | 3 | 80 | 4.1 | 12 | −60 |
| 2 | 50:50 | 23 | 100 | 2.3 | 12 | −27 |

An X-ray diffraction pattern of Polymer No. 1 showed that it was highly crystalline and it was identified as isotactic cis-1,4-polypiperylene. The X-ray diffraction pattern of Polymer No. 2 was amorphous, indicating a relatively random copolymer. NMR analysis of Polymer No. 1 revealed that its microstructure was 87% 1,4- and 13% 1,2-polypiperylene.

EXAMPLE XXI

Solutions of two piperylene monomers were prepared in hexane, so that each solution contained 10 gm. of piperylenes per 100 ml. of solution. The trans-piperylene monomer analyzed 95.6% trans-1,3-pentadiene, 3.3% cis-1,3-pentadiene and 1% cyclopentane; the cis-piperylene monomer analyzed 94.6% cis-1,3-pentadiene and 5.3% trans-1,3-pentadiene. The hexane solutions of these monomers were passed down separate columns of silica gel, and then aliquots of each were added to a series of 4-ounce bottles to prepare premixes containing the cis- and trans-monomers in different ratios, e.g., 25/75, 50/50 and 75/25. The polymerizations were catalyzed by charging the catalyst TIBAL:FeOct:AIBN=3:1:1 millimole/100 gm. of monomers and tumbling end-over-end in a 50° C. water bath. The results are summarized in Table 20.

Table 20

| Exp. No. | Charge cis:trans 1,3-PD | Time, Hours | Yield, Wt.% | DSV dl/g | % Gel | Tg, °C. | NMR, % 1,4- | 1,2- | 3,4- |
|---|---|---|---|---|---|---|---|---|---|
| 1 | 25:75 | 2 | 79 | 3.7 | 14 | −5 | 25 | 73 | 2 |
| 2 | 50:50 | 2 | 58 | 3.3$^a$ | 13 | −7 | 51 | 48 | 1 |
| 3 | 50:50 | 18 | 99 | 4.3 | 9 | $^b$ | | ND | |
| 4 | 75:25 | 18 | 98 | 5.8 | 5 | −59 | 78 | 22 | 0 |

$^a$Mn (by osmotic membrane method) = 290,000.
$^b$Polymer No. 3 had a Tg at both −60° and −2° C.

Polymers No. 1 and 2 were plastic-like, similar to syndiotactic trans-1,2-polypiperylene. Polymers No. 3 and 4 were rubbery, but were somewhat tougher than isotactic cis-1,4-poolypiperylene. The two isomers copolymerize although there apparently is some block copolymerization due to the fact that the trans-isomer tends to polymerize more rapidly than does the cis-isomer.

EXAMPLE XXII

Three separate solutions of monomers in heptane were prepared. Two of these, 2,3-dimethyl-1,3-butadiene (DMB) and the 95% trans-1,3-pentadiene (PD), were part of the same solutions used in Example XVIII; the third was 1,3-butadiene (BD) in heptane as prepared in Example XVII. Each of the solutions contained 10 g. of the respective monomer per 100 ml. of solution. Aliquots of these solutions were added to 4-ounce bottles and terpolymerizations were conducted after injection of the catalyst, which was TIBAL:FeOct:AIBN=3:1:1 millimole per 100 gm. of total monomers. Polymerization temperature was 50° C. The polymerizations were stopped when viscous polymer cements formed in order to mix adequately the stabilizer into the polymers.

Table 21

| Exp. No. | Monomer Charge,Wt.% DMB: | BD: | t-PD | Time, Hours | Yield Wt. % | DSV dl/g | % Gel | Tg °C. |
|---|---|---|---|---|---|---|---|---|
| 1 | 50 | 25 | 25 | 1.0 | 30 | ND | ND | ND |
| 2 | 25 | 50 | 25 | 0.5 | 59 | 7.0 | 58 | −27 |
| 3 | 23 | 26 | 51 | 1.0 | 61 | 5.9 | 11 | −19 |

These polymers were elastomeric and exhibited only one glass transition temperature, Tg, indicating formation of co- or terpolymers.

EXAMPLE XXIII

A premix containing approximately 100 gm. of both trans-piperylene and butadiene was prepared by adding 158 ml. of a piperylene fraction (95.6% trans-, 3.1% cis-piperylene and 1% cyclopentene) and 167 ml. of liquid butadiene (Phillip's rubber grade) to 1675 ml. of hexane, and purifying it by passing it down a column of silica gel, charging 100 ml. to a series of 4-ounce bottles, and then sparging with nitrogen. In addition, a premix containing 100 gm. of trans-piperylene per liter of solution and another containing 100 gm. of butadiene per liter were prepared. Aliquots of these last two premixes were measured into 4-ounce bottles in order to provide premixes containing weight ratios of 25:75 and 75:25 parts of butadiene to trans-piperylene (t-PD).

The catalyst charged to the first three experiments listed in Table 22 was TIBAL:FeOct:AIBN=2:0.5:0.5 millimoles per 100 gm. of monomer. The catalyst charged to the rest of the experiments was increased to 3:1:1 mhm. The polymerizations were stopped after various time intervals in order to obtain different degrees of conversion. Some results are summarized in Table 22.

Table 22

| Exp. No. | Charge, Wt.% BD/t-PD | Time, mins. | Yield Wt.% | DSV dl/g | % Gel | IR anal., est. PBD | trans-PPD |
|---|---|---|---|---|---|---|---|
| 1 | 50:50 | 20 | 42 | 7.9 | 8 | 70 | 30 |

Table 22-continued

| Exp. No. | Charge, Wt.% BD/t-PD | Time, mins. | Yield Wt.% | DSV dl/g | % Gel | IR anal., est. PBD | trans-PPD |
| --- | --- | --- | --- | --- | --- | --- | --- |
| 2 | 50:50 | 30 | 68 | 9.5 | 6 | 64 | 36 |
| 3 | 50:50 | 45 | 80 | 8.3 | 8 | 57 | 43 |
| 4 | 75:25 | 10 | 76 | 5.9 | 47 |  | ND |
| 5 | 50:50 | 10 | 44 | 5.7 | 5 |  | ND |
| 6 | 50:50 | 15 | 73 | 6.8 | 5 |  | ND |
| 7 | 50:50 | 30 | 91 | 6.6 | 8 |  | ND |
| 8 | 25:75 | 30 | 70 | 5.7 | 8 |  | ND |

Butadiene polymerized more rapidly than piperylene did. This is indicated by the higher polymer yields obtained within a given time when using higher BD:t-PD charge ratios, and also by the estimated infrared analyses of the copolymers. The presence of trans-piperylene resulted in the production of polymers which were much more soluble than polybutadiene homopolymers prepared with the same catalyst system. The copolymers were relatively tough rubbers. The ultimate or break tensile as determined on an Instron for the unmasticated gum stock on a mixture of Polymers No. 6 and 7 was 700 psi and its elongation at break was 750 percent. Polymer No. 7 had an osmotic number average molecular weight equal to 428,000.

EXAMPLE XXIV

Two experiments were performed to show that diethylaluminum cyanide ($Et_2AlCN$) can serve both as the organometallic agent and as a source of all of the nitrogen ligands required to create an active polymerization catalyst.

Two premixes, one containing 100 gm. of butadiene (BD) per liter of benzene solution, and the second containing 100 gm. of isoprene (IP) per liter of hexane solution, were prepared and purified in the manner described in Examples 1 and 11, respectively. Aliquots of these solutions were polymerized at 50° C. at the conditions and with the results reported in Table 23.

Table 23

| Exp. No. | Monomer | Catalyst, mhm FeX$_3$ | Et$_2$AlCN | Time, mins. | Yield Wt.% | DSV dl/g | % Gel | Tg, °C. |
| --- | --- | --- | --- | --- | --- | --- | --- | --- |
| 1 | BD | 0.5 AcAc[1] | 12 | 45 | 48 | ND | 100 | −19 |
| 2 | IP | 0.5 Oct[2] | 2 | 60 | 34 | 10 | 5 | −32 |

[1]AcAc = ferric acetylacetonate,
[2]Oct = ferric octanoate.

The polybutadiene produced with the 2-catalyst component system was quite insoluble. Infrared analysis of a film cast from the $CS_2$-soluble portion of the polymer indicated 11.5% cis-1,4-, 1.5% trans-1,4- and 87% (syndiotactic) 1,2-polybutadiene. The polyisoprene polymer was readily soluble in aromatic hydrocarbons, carbon disulfide and carbon tetrachloride. Infrared solution analysis reported its microstructure to be 60% 1,4-, 35% 3,4- and 5% 1,2; analysis by NMR indicated 40% 1,4-, 49% 3,4- and 11% 1,2-polyisoprene.

EXAMPLE XXV

A butadiene in dichloromethane premix was prepared by adding 333 ml. of liquid butadiene to 1667 ml. of Eastman's dichloromethane, and then purifying the solution as described in Example I. The premix contained approximately 10 gm. of butadiene per 100 ml. Catalysts were injected and the solutions were polymerized at 50° C. for 2 hours. Results are summarized in Table 24.

Table 24

| Exp. No. | Catalyst, mhm TIBAL | Fe(AcAc)$_3$ | AIBN | Yield Wt.% | DSV dl/g. | % Gel |
| --- | --- | --- | --- | --- | --- | --- |
| 1 | 3 | 1.0 | 1 | 35 | 1.1 | 95 |
| 2 | 6 | 1.0 | 1 | 77 | 4.9 | 90 |
| 3 | 6 | 0.25 | 1 | 100 | ND |  |
| 4 | 20 | 0.1 | 20 | 81 | 0.8 | 94 |

Polymer No. 4 had a Tg= −24° C. All of the polymers were relatively insoluble. A sample of dried Polymer No. 4 was dispersed in dichloromethane and the microstructure, estimated from the infrared spectra obtained on a film cast from the dispersion, was 12% cis-1,4, 1% trans-1,4- and 87% 1,2-polybutadiene.

EXAMPLE XXVI

A butadiene in hexane premix was prepared by the procedure described in Example I. The source of the nitrogen ligand employed in this series of experiments was diethylaluminum cyanide. Polymerizations were conducted at 50° C. for 18 hours. Catalyst concentrations and polymerization results are summarized in Table 25.

Table 25

| Exp. No. | mhm FeOct | TEAL | EACN[1] | Yield Wt. % | Tg, °C. | IR Anal., % cis- | trans- | 1,2- |
| --- | --- | --- | --- | --- | --- | --- | --- | --- |
| 1 | 0.5 | 1 | 0.5 | 96 | ND[2] | 15 | 1 | 84 |
| 2 | 0.5 | 1 | 2.0 | 93 | −13 |  | ND |  |
|  | TEAL | FeCl$_3$ |  |  |  |  |  |  |
| 3 | 6 | 2 | 2.0 | 100 | −25 |  | ND |  |

[1]EACN = diethylaluminum cyanide.

Polybutadienes prepared using diethylaluminum cyanide to provide the nitrogen ligand are comprised of a relatively high percentage of syndiotactic 1,2-polybutadiene.

EXAMPLE XXVII

This example illustrates that monomers can be satisfactorily polymerized in the presence of impurities such as acetylene and cyclopentadiene by employing the catalyst system of the instant invention. The monomer utilized was trans-1,4 piperylene. The techniques used in this example were similar to those used in Example I.

Table 26

| Exp. No. | Millimole/100g . monomer | | | Impurity ppm* | Pzn. time Hrs. | Yield Wt. % | DSV | Gel |
|---|---|---|---|---|---|---|---|---|
| | TIBAL | FeOct | AlBN | | | | | |
| 1 | 3.0 | 1.0 | 1.0 | — | 0.5 | 96 | 4.8 | 13 |
| 2 | " | " | " | 1-hexyne 2500 | 1.0 | 98 | 5.4 | 21 |
| 3 | " | " | " | CPD 50 | 0.5 | 90 | 5.0 | 20 |
| 4 | " | " | " | CPD 500 | 0.5 | 66 | 5.2 | 32 |

*parts per million.

EXAMPLE XXVIII

A premix containing 10 grams of cis-1,3-pentadiene per 100 ml. of solution was prepared by adding 475 ml. of a hydrocarbon fraction which analyzed 98.6 percent cis-piperylene to 2525 ml. of hexane, and purifying it by passing it down a silica gel column and then sparging it with nitrogen. Eight hundred milliliters of the premix was charged to a quart bottle. Polymerization was initiated by adding 2.4 millimoles of triisobutylaluminum (TIBAL), 0.8 millimole of iron octoate and 0.8 millimole of azobisisobutyronitrile, and tumbling ene-over-end in a water bath at 50° C. The polymerization was terminated after four hours and the yield of dry polymer was 68.4 grams (85.5%). The Mooney viscosity of the polymer (ML-4 at 212° F.) was 74 and its DSV was 7.4. It exhibited a sharp glass transition temperature at −60° C. An NMR analysis reported that its microstructure was comprised of 99 percent cis-1,4- and one percent 1,2-polypiperylene.

By the term "isotactic" is meant a type of polymer structure in which groups of atoms which are not part of the backbone structure are located either all above or all below the atoms in the backbone chain, when the latter are arranged so as to be all in one plane.

By the term "atactic" is meant a type of polymer molecule in which substituent groups or atoms are arranged randomly above and below the backbone chain or atoms, when the latter are arranged so as all to be in the same plane.

By the term "syndiotactic" is meant a type of polymer molecule in which groups or atoms that are not part of the backbone structure are located in some symmetrical and recurring fashion above and below the atoms in the backbone chain, when the latter are arranged so as to be in a single plane.

While certain representative embodiments and details have been shown for the purpose of illustrating the invention, it will be apparent to those skilled in this art that various changes and modifications may be made therein without departing from the spirit or scope of the invention.

What is claimed is:

1. A catalyst composition suitable for the polymerization of conjugated diolefins to stero regular solid elastomers consisting essentially of (1) an iron containing compound selected from the group consisting of iron salts of carboxylic acids, organic complex compounds of iron, iron salts of inorganic acids and iron carbonyls, (2) an organometallic reducing agent selected from the group consisting of organoaluminum compounds, organolithium compounds and organosodium compounds and (3) a nitrogen containing ligand characterized in that said ligand has at least two functional groups or atoms wherein the first functional group is a cyano group (—C≡N) and the second functional group is selected from the group consisting of (a) another cyano group, (b) azo group, (c) imine group, (d) vinylene group, (e) mercapto group, and (f) thio group and there must not be more than two additional carbon atoms separating the first functional group and the second functional group, in which the mole ratio of the organometallic compound to the iron compound ranges from about 1/1 to about 400/1 and the mole ratio of the nitrogen ligand to the iron compound ranges from about 0.1/1 to about 100/1.

2. A composition according to claim 1 in which the iron containing compound is selected from the group consisting of ferric hexanoate, ferric octanoate, ferric decanoate, ferric stearate, ferric naphthenate, ferrous acetylacetonate, ferric acetylacetonate, ferric-1-ethoxy-1,3-butanedionate, ferrous dimethyl glyoxime, ferric chloride, ferrous chloride, ferric bromide, ferric fluoride, ferric phosphate, ferrous sulfate, iron tetracarbonyl, iron pentacarbonyl and iron nonacarbonyl and in which the organometallic compound is defined by the formula

in which $R_1$ is selected from the group consisting of alkyl (including cycloalkyl), aryl, alkaryl, arylalkyl, alkoxy, hydrogen, cyano and halogen, $R_2$ and $R_3$ being selected from the group of alkyl (including cycloalkyl), aryl, alkaryl and arylalkyl, and in which the nitrogen containing ligand is selected from the group consisting of cyanogen, malonitrile, succinonitrile, methyl succinonitrile, 1,2-dicyanobenzene, 1,2-dicyanocyclobutane, tetracyanoethane, tetracyanoethylene, hexacyanoisobutylene, 2,5-diamino-3,4-dicyanothiophene, 3,4-dicyanopyrrole, 2,3-dicyano-2-butene, diethylaluminum cyanide, azobisisobutyronitrile, 2,2'-azobis-2,4-dimethylvaleronitrile, 2-t-butylazo-2-cyanopropane, 2-t-butylazo-2-cyanobutane, 2-t-butylazo-2-cyano-4-methylpentane, 2-t-butylazo-2-cyano-4-methoxy-4-methylpentane, 1-t-butylazo-1-cyanocyclohexane, ethylene bis-(4-butylazo-4-cyanovalerate), 2-(t-butylazo)isobutyronitrile, iminodicyanodiamide, iminosuccinonitrile, diiminosuccinonitrile, fumaronitrile, maleonitrile, 1,4-dicyano-2-butene, acrylonitrile, methacrylonitrile, 2-chloroacrylonitrile, diaminomaleonitrile, 1-cyano-1-propene, 1-cyano-1,3-butadiene, 1,2-dicyano-1-butene, 2-mercapto-isobutyronitrile, 2-mercapto-propionitrile, butyl thiocyanate, hexyl thiocyanate, benzyl thiocyanate, phenyl thiocyanate, potassium thiocyanate, potassium cyanate, 2-cyanoacetamide and 2-cyanoformamide, and in which the mole ratio of the organometallic compound to the iron compound ranges from about 1/1 to about 4/1 and the molar ratio of the nitrogen ligand to the iron compound ranges from about 0.3/1 to about 3/1.

3. A catalytic composition according to claim 1 in which the iron containing compound is selected from the group consisting of iron octanote, iron decanoate, iron naphthenate and ferric acetylacetonate; the organometallic compound is selected from the group consisting of trialkylaluminums and dialkylaluminum hydrides; the nitrogen containing ligand is selected from the group consisting of azobisisobutyronitrile, tetracyanoethylene, fumaronitrile and butylthiocyanate; and the molar ratio of the organometallic compound to the iron compound (Al/Fe) is from about 1/1 to about 12/1 and the molar ratio of the nitrogen ligand to the iron compound (N/Fe) is from about 0.1/1 to about 3/1.

* * * * *